Aug. 29, 1961 J. D. PETERMAN 2,998,214
SHOCK ABSORBING CUSHION FOR AIR DROP OPERATIONS
AND METHOD OF FORMING THE SAME
Filed Feb. 25, 1959

INVENTOR
John D. Peterman
BY W. J. Eccleston,
ATTORNEY

United States Patent Office 2,998,214
Patented Aug. 29, 1961

2,998,214
SHOCK ABSORBING CUSHION FOR AIR DROP OPERATIONS AND METHOD OF FORMING THE SAME
John D. Peterman, Chicago, Ill., assignor to the United States of America as represented by the Secretary of the Army
Filed Feb. 25, 1959, Ser. No. 795,565
3 Claims. (Cl. 244—138)
(Granted under Title 35, U.S. Code (1952), sec. 266)

The invention described herein, if patented, may be manufactured and used by and for the Government for governmental purposes, without the payment to me of any royalty thereon.

My invention relates to a shock absorbing cushion for air drop operations and method of forming the same. It has to do particularly, although not exclusively, with such a cushion and method useful in the handling and airborne shipment and chute-dispersal of material in military operations, the cushion being formed of filled or preferably empty cans, such as beer cans, embedded in foam plastic. While the article and method of producing it are mentioned as being especially useful for military operations, they are, of course, equally well suited for non-military use. The cushions provide excellent and also inexpensive dunnage units having diversified uses.

An object of my invention is to provide a new and improved shock absorbing cushion for air drops of supplies having improved energy absorbing characteristics ensuring the safe delivery thereof by parachute to isolated areas, or locations, devoid of aircraft landing fields or landing strips.

Another object of my invention is to produce an improved cushion as aforesaid which is of simple structure, inexpensive to produce, easy to handle and use as a dunnage component, and one which can be produced in the field by a simple and fast method, or process, and by means of available material or equipment.

Another and important object of my invention is to provide a new and improved cushion, as above, the energy absorbing characteristics of which may be controlled or regulated at advanced air bases to meet the need or requirement of each individual air drop as determined by its weight, terminal velocity, and the fragility factors of the load.

A further object of the invention is to provide an improved shock absorbing cushion having a weight factor of only the order of 70% to 80% of previously-known shock absorbing cushions, or dunnage members.

A further object of the invention is to make shock absorbing cushions out of used beer cans and other available material, in which the cans and/or other material are embedded in a unit of foamed plastic.

Another and important object of my invention is to provide a method or process by which new and novel shock absorbing cushions, including foamed plastic, can be economically produced on a production line basis at advanced air bases and elsewhere.

The foregoing and other objects and advantages of my present invention will appear from the following description and appended claims when considered in conjunction with the accompanying drawing forming a part of this specification wherein like reference characters represent corresponding parts in the several views.

Figure 7:
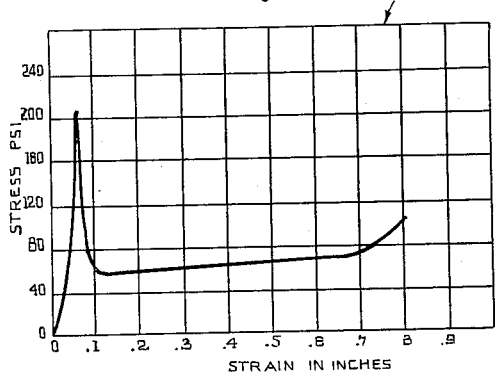
Figure 8:
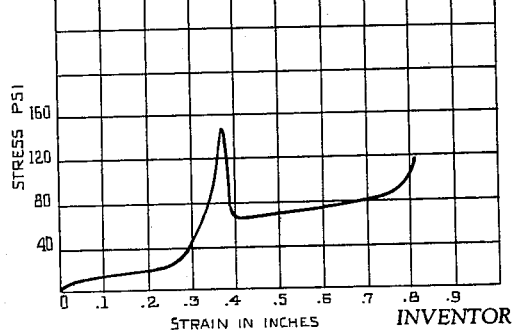

FIG. 7 is a graph, or chart, illustrating a test of stress p.s.i. versus strain in inches of used beer cans within a 200-pound test fiberboard container; and FIG. 8 is another graph, or chart, illustrating a test of stress p.s.i. versus strain in inches of used beer cans embedded in a suitable foamed plastic, expanded over the cans in a 200-pound test in a container, such as a fiberboard container.

Figure 1:
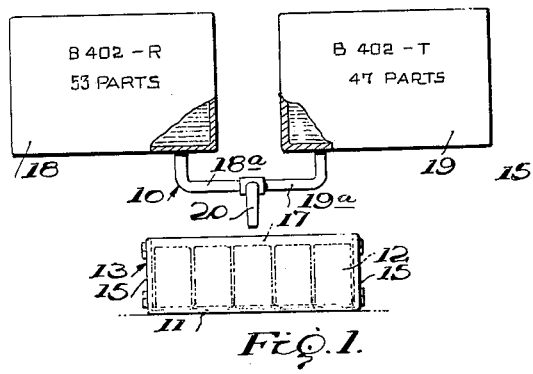
FIG. 1 is a front elevational view, partly broken away, illustrating one method or process of forming a shock absorbing cushion, in accordance with the invention, and certain equipment for use in performing said method.
Figure 2:
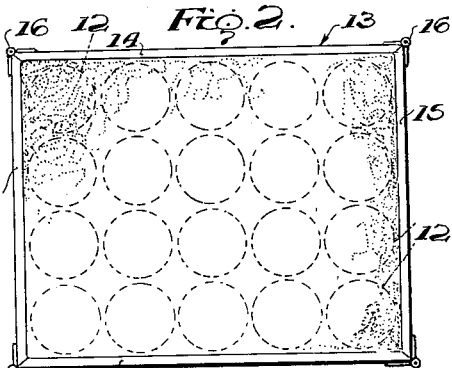
FIG. 2 is a top plan view, on an enlarged scale, of the mold and contained cushion of FIG. 1, showing the cans set into the foamed plastic in even rows of fives.
Figure 4:
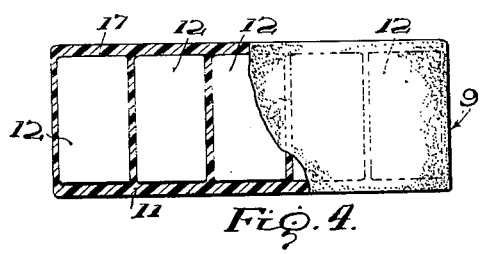
FIG. 4 is a side elevational view, partly in section, of the cushion of FIG. 2 after removal from the mold of FIG. 2.

With reference now to FIGS. 1, 2 and 4 of the drawing, there is shown (FIG. 1) suitable means 10 for supplying plastic foam to an improvised or simple mold into which a thin base layer 11 of the plastic foam has been placed to receive the four (4) rows of five (5) used or empty beer cans 12 in upright position. The mold shown as a whole at 13, is a four-sided rectangular one having sides 14, 14 which are longer than its ends 15, 15. These sides and ends are hingedly connected together by hinges 16 which have, preferably, removable pintles to permit separation of the hinge halves when it is desired to dismantle the mold 13 upon completion of a cushion unit. It is to be noted that the molded or foamed plastic and can unit includes a covering layer 17 of the foamed plastic.

The equipment employed to produce the shock absorbing unit 9 of FIG. 4 includes a tank 18 containing one plastic foam, and a second tank 19 which contains another plastic foam. These liquid or semi-liquid known and available reactant mixtures, the first consisting of 53 parts and the second consisting of 47 parts, flow through pipes 18a and 19a, respectively, to a mixing nozzle 20, from whence they pass into mold 13 to fill the same, surrounding the cans 12 on all sides. After forming is completed, the whole was allow to set until cool. The surplus, or rounded head (not shown) was cut away and the mold 13 removed, leaving the cushion or unit 9 of FIG. 4. For convenience, the foam in tank 18 is identified as B402R and that in tank 19 as B402T.

Figure 5:
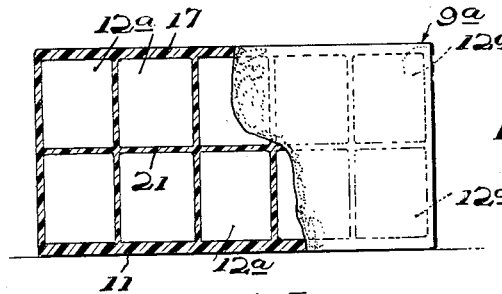
FIG. 5 is a view similar to FIG. 4 but showing a unitary cushion of cans embedded in foamed plastic after removal from a mold, but with tiered rows of cans in which all of the individual cans are entirely surrounded by and embedded in the foamed plastic.

FIG. 5 shows a cushion or shock absorbing unit 9a similar to cushion 9 except that the cans 12a are arranged in rows in two tiers with an intervening layer or divider 21 of foamed plastic and with a base layer 11 and a top or covering layer 17.

The method or process of producing the cushion unit of FIG. 4 includes the step of flowing or pouring a small quantity of the liquid or semi-liquid reactant mixtures from supply tanks 18 and 19 into the bottom of the mold 13 just prior to placing the cans 12 therein to provide the foamed plastic base 11.

When producing the cushion unit of FIG. 5, the mixtures are fed into the mold 13 to produce the base 11. The cans 12a of the bottom tier are then placed in the mold to rest upon the base 11. An intermediate horizontal layer 21 of foamed plastic is then formed over the rows of cans of the bottom tier, after which the upper tier of rows of cans 12a is placed in the carton. Then more of the mixtures is allowed to flow from tanks 18 and 19 to completely surround and submerge the upper tier of cans. After the foamed plastic sets, any humped or mounded-up surplus is cut off to produce the cushion 9a of FIG. 5.

Figure 3:
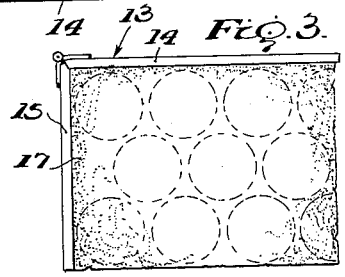
FIG. 3 is a fragmentary top plan view of a corner of a formed cushion in a mold like that of FIGS. 1 and 2, showing the rows of cans in staggered relationship.
Figure 6:
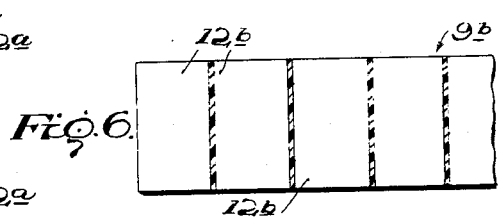
FIG. 6 is a fragmentary side elevation of a somewhat modified cushion unit embodying the present invention wherein rows of cans are embedded in foamed plastic but with, however, their top and bottom ends exposed.

FIG. 6 shows a cushion unit 9b which has been produced in a mold like mold 13 of FIGS. 1 and 3. With this form, the rows of cans 12 are placed on end in the mold (not shown) and then the liquid or semi-liquid reactant mixtures from tanks 18 and 19 are poured into the mold to flow into the spaces surrounding the cans to cause the same to be embedded therein when the mixtures cool and set to form the foamed plastic. Any surplus plastic may be cut away to leave the composite cushion unit 9b, as shown.

Since the mixtures from tanks 18 and 19, because of their nature and ingredients, enter the different molds in a bubbly or effervescent state, the base layers 11 of FIGS. 1, 4 and 5 and the intermediate layer 21 of FIG. 5 are not, initially, of a consistency to support the cans. Since, however, the reactant mixtures cool and thus set, or harden rapidly, only a few minutes pause after pouring is required for the foamed plastic to reach a condition of forous solidity capable of supporting the weight of the cans. This same treatment applies in like manner to the production or creation of the covering layer 17 of FIGS. 1, 4 and 5.

Various known and available foamed plastics may be employed. Any and all of the reactant mixtures which I may choose to employ, expand and set, and during this state of the evolution the cans are securely held in place and are ready to be fastened or secured to the parachute load.

Static compression tests on a carton of beer cans alone (not shown) and on the foamed plastic-can combination shock absorbing cushion of FIG. 4 have been run, and the results of these tests are shown by the curves in the stress-strain graphs of FIGS. 7 and 8 of the accompanying drawing, FIG. 7 being the graph for the beer cans alone, and FIG. 8, the graph for the cushion 9 of FIG. 4. The tests were made in 200-pound test fiberboard containers, one (represented by graph 22) consisting of beer cans alone, and the other (represented by graph 23), while using a combination of regular 12-ounce beer cans and foam plastic having a theoretical density of 2 pounds per cubic foot, with an actual density, after expansion, of from 3 pounds to 3.6 pounds per cubic foot.

A shock resisting sample cushion, like that shown at 9 in FIG. 4 was placed in a standard conditioning room and allowed to remain over a weekend. Upon removal, a static compression load was applied to the sample, using a Tinus Olsen hydraulic compression tester. From the force-deflection curve recorded on the compression tester, a stress versus strain curve was made for each sample.

The sample of FIG. 4 was placed in a minus 40° F. room; in a 100° F., 90 percent relative humidity room; and in a water immersion tank for a period of 72 hours and examined for evidence of disintegration. The results were most satisfactory. The foamed plastic of sample cushion 9 remained stable under the water immersion, and also the extreme temperature tests.

The results of the static compression tests are presented on the graphs which constitute FIGS. 7 and 8 of the accompanying drawing. These graphs, identified by the numerals 22 and 23 and showing the results of the test for the beer cans alone (not shown) and for cushion 9, respectively, give the stress in pounds per square inch versus strain in inches, thus:

$$\text{Stress} = \frac{\text{Force}}{\text{Area of surface on which force acts}}$$

$$\text{Strain} = \frac{\text{Displacement}}{\text{Original sample thickness}}$$

With reference to graph 22 (FIG. 7), the result of the test on the beer cans alone is shown as impact stress per square inch (the vertical column) and strain in inches (the horizontal column).

The graph 23 (FIG. 8) shows the result of the test of the combination cushion unit of FIG. 4 (cans 12 in expanded foamed plastic 11), the impact stress per square inch being indicated in the vertical column and the strain in inches being indicated by the horizontal column at the bottom of the graph, the difference and advantage of the use of the beer cans-foamed plastic combination cushion of FIG. 4 being clearly evident.

Other tests have been made with respect to the cushions of FIGS. 5 and 6, both being foamed plastic and beer can combinations, and these are not included herein since it is thought that the reports above of the comparative tests upon cans alone and the can-foamed plastic combination of FIG. 4 are sufficient to illustrate the superiority of the latter over the former.

Obviously, the invention is not limited to the embodiments herein shown and described, but may assume other forms.

I claim:

1. That improvement in the art of shock and energy absorbing unitary cushion-like means for use in connection with the aerial delivery of supplies, which comprises an exposed rebound-resistant heterogeneous mass of expanded foamed plastic and a plurality of empty metal beverage cans embedded and thus held therein, whereby upon impact with the ground said means absorbs the energy by the crushing of said mass of plastic and of said metal cans to reduce and thus check the rebound effect of the load of supplies to a minimum.

2. That improvement in the art of shock and energy absorbing unitary cushion-like means for use in connection with aerial delivery of supplies, which comprises an exposed rebound-resistant heterogeneous mass of expanded foamed plastic and a plurality of empty metal beverage cans embedded and thus held therein, the combined expanded plastic and the locked-in cans together having the required physical characteristics, whereby upon impact with the ground, said mass will absorb the energy by the resultant crushing of the combined plastic and metal cans to maintain the amount of rebound at a minimum.

3. A shock and energy rebound-resistant airdrop cushion for use in connection with the aerial delivery of supplies comprising, in combination, an exposed preformed heterogeneous mass of expanded foamed plastic having embedded and thus locked therein a plurality of empty metal beverage cans, in which the expanded plastic has a density of from approximately 3 to approximately 3.6 pounds per cubic foot.

References Cited in the file of this patent

UNITED STATES PATENTS

| | | |
|---|---|---|
| 2,644,655 | Kitch | July 7, 1953 |
| 2,780,350 | Simon et al. | Feb. 5, 1957 |
| 2,857,510 | Haggerty et al. | Oct. 21, 1958 |
| 2,873,392 | Rich | Feb. 10, 1959 |

OTHER REFERENCES

"This Week" magazine section of the Feb. 24, 1957, issue of The Sunday Star, Washington, D.C., newspaper, page 18 relied upon.